(12) United States Patent
Thomas (10) Patent No.: US 10,096,225 B2
(45) Date of Patent: Oct. 9, 2018

(54) DIGITAL WEARABLE MONITORING DEVICE WITH DUAL LOCKING SYSTEM

(71) Applicant: Ramone Thomas, Wellington, FL (US)

(72) Inventor: Ramone Thomas, Wellington, FL (US)

( * ) Notice: Subject to any disclaimer, the term of this patent is extended or adjusted under 35 U.S.C. 154(b) by 0 days.

(21) Appl. No.: 15/655,454

(22) Filed: Jul. 20, 2017

(65) Prior Publication Data

US 2018/0025605 A1 Jan. 25, 2018

Related U.S. Application Data

(60) Provisional application No. 62/364,962, filed on Jul. 21, 2016.

(51) Int. Cl.

| | | |
|---|---|---|
| *H04M 11/04* | (2006.01) | |
| *G08B 21/02* | (2006.01) | |
| *H04B 1/3827* | (2015.01) | |
| *E05B 73/00* | (2006.01) | |
| *H04R 1/04* | (2006.01) | |
| *H04R 1/08* | (2006.01) | |
| *G06F 3/16* | (2006.01) | |
| *A44C 5/00* | (2006.01) | |
| *H04R 1/02* | (2006.01) | |
| *A44C 5/20* | (2006.01) | |

(Continued)

(52) U.S. Cl.
CPC ........ *G08B 21/0208* (2013.01); *A44C 5/0015* (2013.01); *E05B 73/00* (2013.01); *G06F 3/165* (2013.01); *G08B 21/0211* (2013.01); *H04B 1/385* (2013.01); *H04R 1/04* (2013.01); *H04R 1/08* (2013.01); *A44C 5/2076* (2013.01); *A44D 2203/00* (2013.01); *E05B 47/0002* (2013.01); *E05B 2035/009* (2013.01); *G07C 9/00563* (2013.01); *H04R 1/028* (2013.01); *H04R 2430/01* (2013.01); *H04R 2499/11* (2013.01); *H04W 4/02* (2013.01)

(58) Field of Classification Search
CPC ............ G08B 21/0208; G08B 21/0211; A44C 5/0015; A44C 5/2076; E05B 73/00; E05B 2035/009; E05B 47/0002; G06F 3/165; H04B 1/385; H04R 1/04; H04R 1/08; H04R 2499/11; H04R 2035/009
USPC ..... 340/573.4, 539.23, 825.36, 825.37, 10.1, 340/10.4; 455/404.1, 404.2; 342/357.2
See application file for complete search history.

(56) References Cited

U.S. PATENT DOCUMENTS 6,317,049 B1 * 11/2001 Toubia ...................... G01S 5/10
340/539.1
8,140,012 B1 * 3/2012 Causey .............. G08B 13/1427
340/5.31

(Continued)

*Primary Examiner* — Sonny Trinh (57) ABSTRACT

A digital wearable monitoring device with dual locking system allows parents to monitor and locate a missing or wandering child. The monitoring device is secured to a child and can be removed through biometric signatures of a parent or authorized guardians. The monitoring device is preferred to be a wrist strap; however, the present invention may take the form of a belt, necklace, bracelet, earring, or any other applicable clothing accessory. The monitoring device includes a tactile sensor and at least one input device. The tactile sensor allows the wearer to write, draw, or tap a message to be processed and transmitted to a parent or authority. A location device then allows the parent or authority to locate and rescue the wearer.

18 Claims, 10 Drawing Sheets

(51) Int. Cl.
    *H04W 4/02*         (2018.01)
    *E05B 47/00*        (2006.01)
    *G07C 9/00*         (2006.01)
    *E05B 35/00*        (2006.01)

(56) References Cited

U.S. PATENT DOCUMENTS

| | | | |
|---|---|---|---|
| 9,002,372 B2 * | 4/2015 | Shakespeare | H04W 64/00 340/539.13 |
| 9,928,713 B2 * | 3/2018 | Baczuk | G08B 21/0211 |
| 9,930,715 B2 * | 3/2018 | Lee | H04B 1/385 |
| 2008/0055072 A1 * | 3/2008 | Holoyda | G08B 21/0202 340/539.13 |
| 2015/0348389 A1 * | 12/2015 | Jang | H04W 4/90 455/404.1 |
| 2016/0094700 A1 * | 3/2016 | Lee | H04W 8/245 455/419 |
| 2016/0247378 A1 * | 8/2016 | Baczuk | H04W 4/70 |
| 2017/0161720 A1 * | 6/2017 | Xing | G06Q 20/3278 |
| 2017/0293740 A1 * | 10/2017 | Xing | H04M 1/72527 |

\* cited by examiner

DIGITAL WEARABLE MONITORING DEVICE WITH DUAL LOCKING SYSTEM

The current application claims a priority to the U.S. Provisional Patent application Ser. No. 62/364,962 filed on Jul. 21, 2016.

FIELD OF THE INVENTION

The present invention relates generally to a tracking device that tracks the location and physical condition of the wearer, in this case a child. More specifically, the present invention utilizes a lockable, wearable tracking device having biometric scanning devices responsible for monitoring the health of wearer.

BACKGROUND OF THE INVENTION

Some children may be unaware of their surroundings while they are playing and might wander out of parental perception. Alternatively, there is a threat of a child being kidnapped while outside of the parental perception. Regardless, there is a need for parents to know any missing or unperceived child is safe and able to find the child if the child has been missing for too long. Therefore, an object of the present invention is to provide a means for a parent to monitor the health and location of a child.

The present invention is a tracking device utilizing biometric scanning devices that secures a band to a child so the present invention is not easily separable from the child. The present invention utilizes wireless and global positioning system (GPS) devices in order to monitor and transmit the location of the child in case the child is kidnapped or lost, facilitating in the quick recovery and prevention of kidnapping of the child. A parent or authorized guardian uses the biometric scanning devices to lock the present invention to the child's wrist. The present invention cannot be removed until the parent or authorized guardian rescans their finger and physically separates the wrist strap. The present invention allows the child to initiate a help alert signal to the parent if they feel as though they are in danger or allows a kidnapper to unwittingly initiate the help alert to bring the parents or law enforcement to the child's location.

DETAIL DESCRIPTIONS OF THE INVENTION

All illustrations of the drawings are for the purpose of describing selected versions of the present invention and are not intended to limit the scope of the present invention.

The present invention is a digital wearable monitoring device with a dual locking system. The present invention allows parents to monitor and locate a missing or wandering child. The present invention is secured to a child and can be removed through biometric signatures of a parent or authorized guardians. The present invention is preferred to be a wrist strap; however, the present invention may take the form of a belt, necklace, bracelet, earring, or any other applicable clothing accessory.

Figure 1:
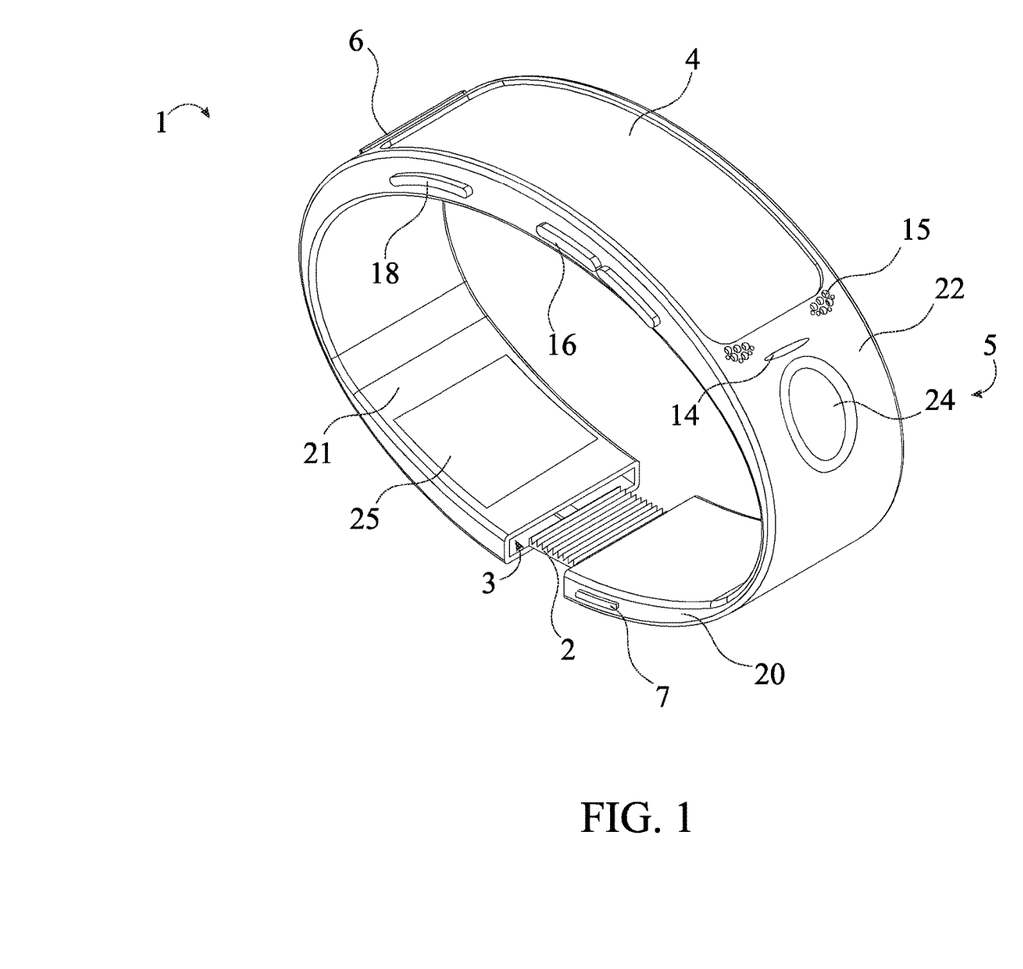
FIG. 1 is a perspective view of the present invention.
Figure 9:
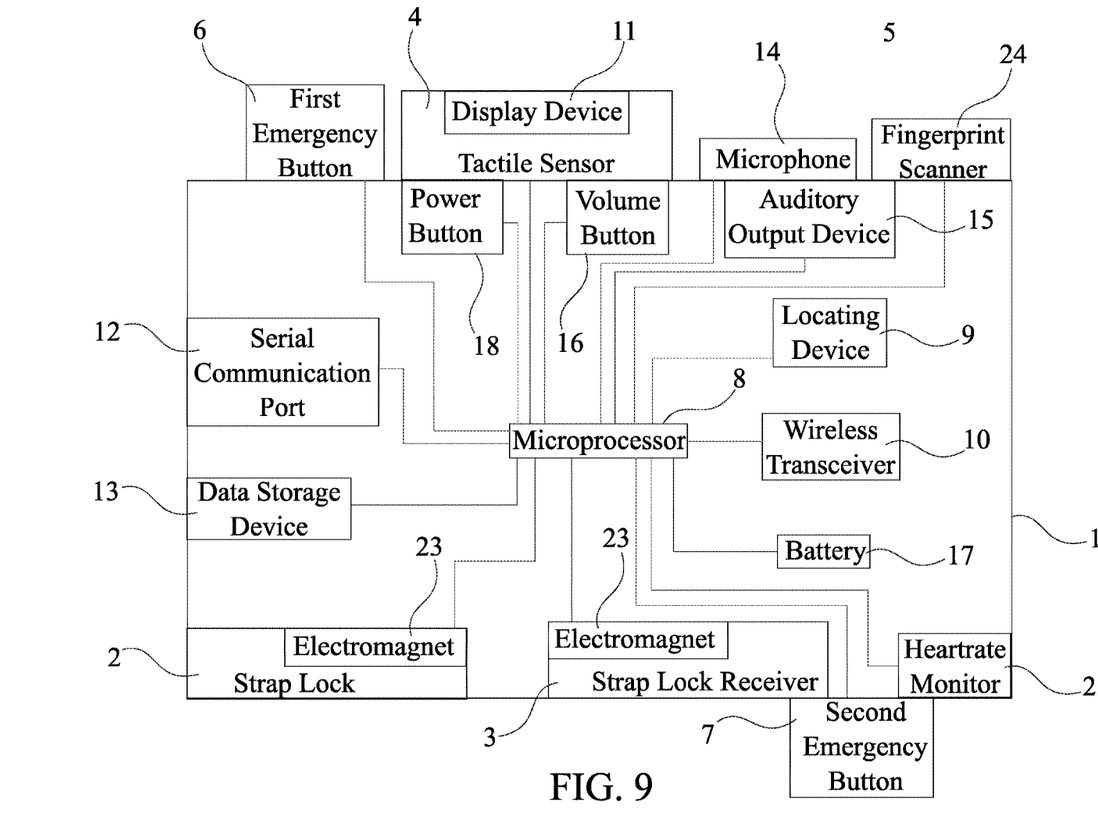
FIG. 9 is a schematic diagram of the electrical components of the present invention.

In accordance to FIG. 1, the present invention comprises a band housing 1, a strap lock 2, a strap lock receiver 3, a tactile sensor 4, at least one biometric input device 5, a first emergency button 6, and a second emergency button 7, as well as, a microprocessor 8, a locating device 9, and a wireless transceiver 10 shown in FIG. 9. The band housing 1 is attached to the wearer through the strap lock 2 and the strap lock receiver 3. The band housing 1 comprises a first band strap 20, a second band strap 21, and a band face 22. The first band strap 20 and the second band strap 21 are oppositely positioned to each other along the band face 22. The strap lock 2 and the strap lock receiver 3 fasten and secure the present invention to the wearer. The strap lock 2 is terminally integrated to the first band strap 20. The strap lock receiver 3 is terminally integrated into the second band strap 21. The strap lock 2 is selectively engaged with the strap lock receiver 3 in order to secure the application about an extremity of the wearer. The tactile sensor 4, the at least one biometric input device 5, the first emergency button 6, and the second emergency button 7 are externally integrated into the band housing 1 in order to allow the wearer to interface with the tactile sensor 4, the at least one biometric input device 5, the first emergency button 6, and the second emergency button 7. The wearer is able to write, draw, or tap on the tactile sensor 4, with a finger or a stylus, as an input to be processed by the microprocessor 8. The tactile sensor 4 is centrally positioned along the band face 22 in order for the wearer to view and efficiently interface with the tactile sensor 4.

The first emergency button 6 and the second emergency button 7 can be pressed to send a signal directly to the authorities or a family member. In accordance to the preferred embodiment of the present invention, if a person presses either the first emergency button 6 or the second emergency button 7 once, a signal is sent to a predetermined phone number through the wireless transceiver 10 that the child or any person is safe. If a person presses either the first emergency button 6 or the second emergency button 7 twice, a signal is sent directly to the authorities through the wireless transceiver 10 that the wearer is in distress. The first emergency button 6 is adjacently positioned to the tactile sensor 4, such that the first emergency button 6 is obviously positioned for anyone looking at the present invention. The second emergency button 7 is adjacently positioned to the strap lock receiver 3, such that the second emergency button 7 is obscured from view except by close inspection of the present invention.

Detailed in FIG. 9, the microprocessor 8, the locating device 9, and the wireless transceiver 10 are internally mounted to the band housing 1, such that the microprocessor 8, the locating device 9, and the wireless transceiver 10 are protected by the band housing 1. The microprocessor 8 processes inputs from and emits an appropriate output to the tactile sensor 4, the at least one biometric input device 5, the first emergency button 6, the second emergency button 7, the locating device 9, and the wireless transceiver 10. The locating device 9 is a device, such as a radio frequency device, a global positioning system (GPS) device, or geographical information system device, that determines the position of the present invention to transmit the location of the present invention to a parent or authority through the wireless transceiver 10. The wireless transceiver 10 is preferred to be a device that communicates over cellular networks, long-range radiofrequency or short-range radiofrequency. The tactile sensor 4, the at least one biometric input device 5, the first emergency button 6, the second emergency button 7, the locating device 9, and the wireless transceiver 10 are electronically coupled to the microprocessor 8.

Figure 8:
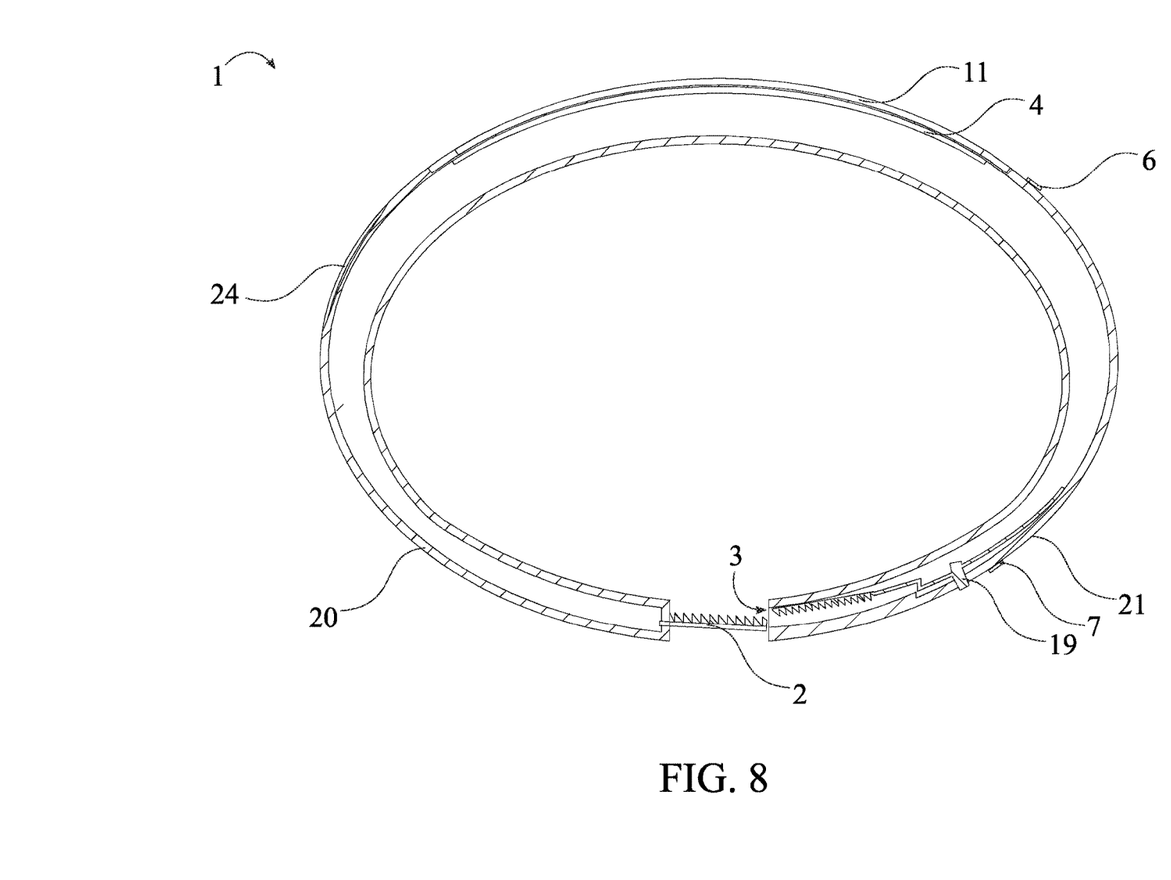
FIG. 8 is a cross-sectional view of the present invention, along line A-A from FIG. 2.

In some embodiments of the present invention, the present invention comprises a display device 11, shown in FIG. 8 and FIG. 9. The display device 11 displays information to the wearer such as time, location, or current vitals, such as heartrate for instance. The display device 11 is integrated with the tactile sensor 4, such that the display device 11 and tactile sensor 4 form a touchscreen display and the wearer can see inputs made with the tactile sensor 4. However, in accordance to the preferred embodiment of the present invention, a display device 11 is not integrated with the tactile sensor 4, such that if the wearer is in trouble and trying to signal for help, the text written, images drawn, or tapping on the tactile sensor 4 is not shown and therefore inconspicuous to kidnappers.

In accordance to the preferred embodiment of the present invention, the at least one biometric input device 5 comprises a fingerprint scanner 24 to receive a fingerprint reference from a parent or authorized guardian, shown in FIG. 1, FIG. 2, FIG. 6, and FIG. 9. The parent or authorized guardian can subsequently input their fingerprint into the fingerprint scanner 24 to authorize a protocol to unlock the strap lock 2 to be removed from the strap lock receiver 3. Thus, the present invention cannot be removed other than by a parent or authorized guardian as the input fingerprint must match the fingerprint reference of a parent or authorized guardian. The fingerprint scanner 24 is preferred to be adjacently positioned to the tactile sensor 4 in order to be accessible to the parent or guardian to input a fingerprint reference or to remove the present invention from the wearer.

In some embodiments of the present invention, the at least one biometric input device 5 comprises a heartrate monitor 25, shown in FIG. 1 and FIG. 9. The heartrate monitor 25 assesses the heartrate of the wearer. The heartrate monitor 25 is oppositely positioned to the tactile sensor 4 about the band housing 1 in order to interface directly with the wearer. If the wearer's heartrate exceeds a predetermined threshold that may signify if the wearer is panicking, a signal for help is transmitted through the wireless transceiver 10 to a parent or authority.

Figure 5:
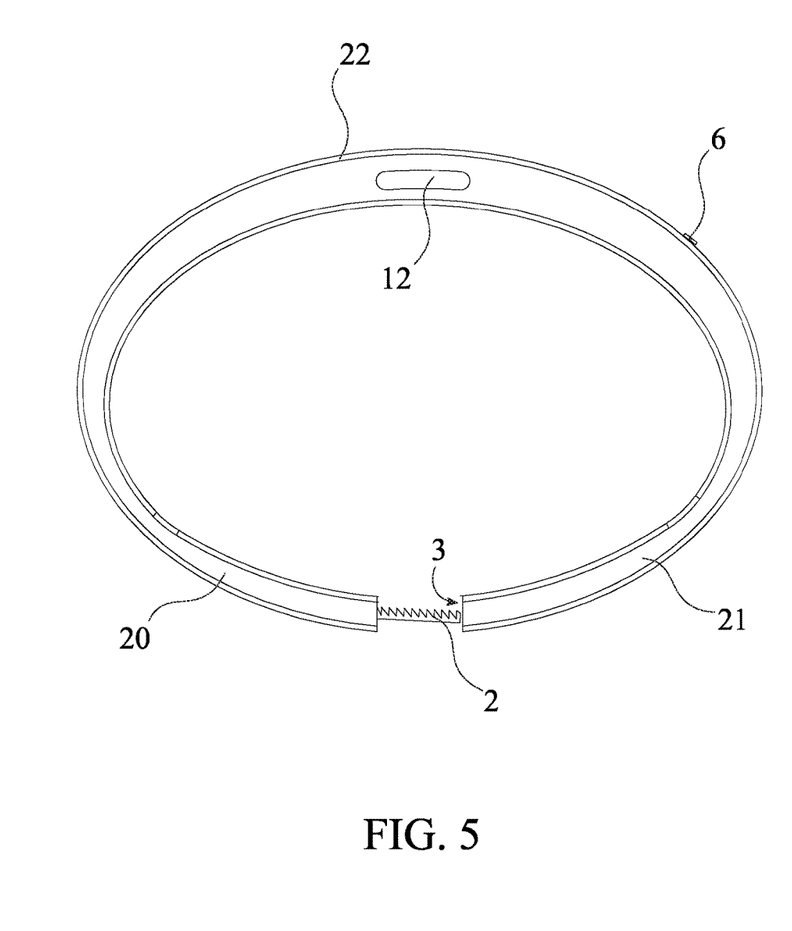
FIG. 5 is a right view of the present invention.
Figure 6:
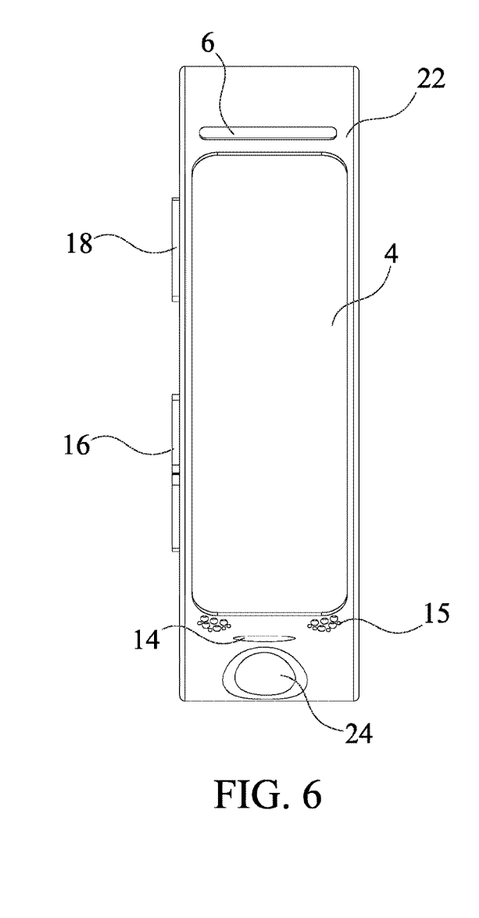
FIG. 6 is a top view of the present invention.
Figure 7:
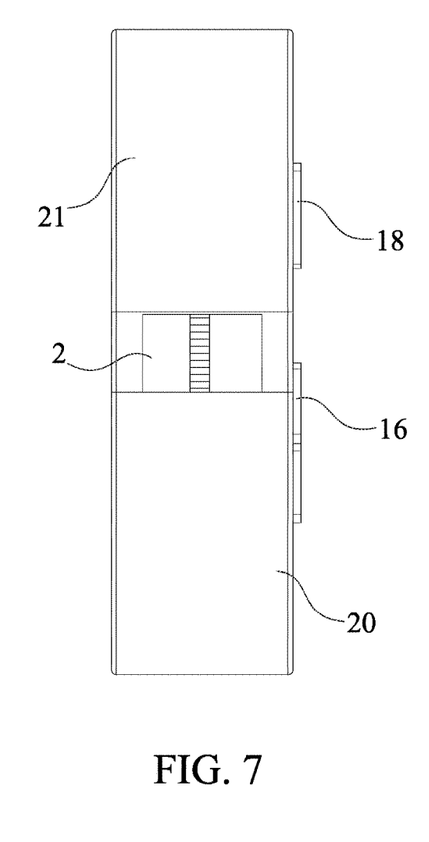
FIG. 7 is a bottom view of the present invention.

Further in accordance to the preferred embodiment of the present invention, the present invention comprises a serial communication port 12, detailed in FIG. 5. The serial communication port 12 allows a user to update firmware, software, or biometric data, such as fingerprints or voice samples of parents or guardians of the wearer from an external computing device. The serial communication port 12 is laterally integrated into the band housing 1. The serial communication port 12 is electronically connected to the microprocessor 8 in order for the data to be processed and stored within the present invention.

Still in accordance to the preferred embodiment of the present invention, the present invention comprises a data storage device 13, shown in FIG. 9. The data storage device 13 retains data such as fingerprint references, voice recognition data, and the software to determine the outputs for the inputs from the tactile sensor 4, the at least one biometric input device 5, the first emergency button 6, the second emergency button 7, the locating device 9, and the wireless transceiver 10. The data storage device 13 is internally mounted to the band housing 1. The data storage device 13 is electronically connected to the microprocessor 8 in order for the software to process the inputs from the tactile sensor 4, the at least one biometric input device 5, the first emergency button 6, the second emergency button 7, the locating device 9, and the wireless transceiver 10 with the microprocessor 8.

Figure 2:
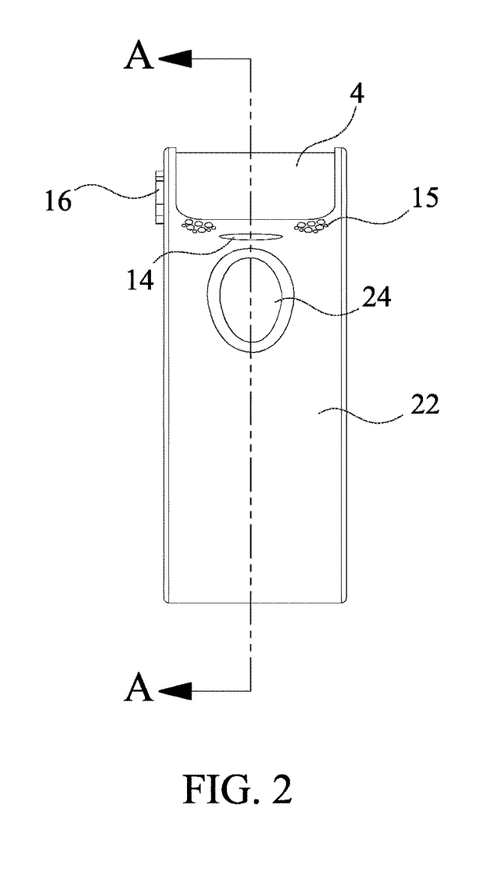
FIG. 2 is a front view of the present invention.
Figure 3:
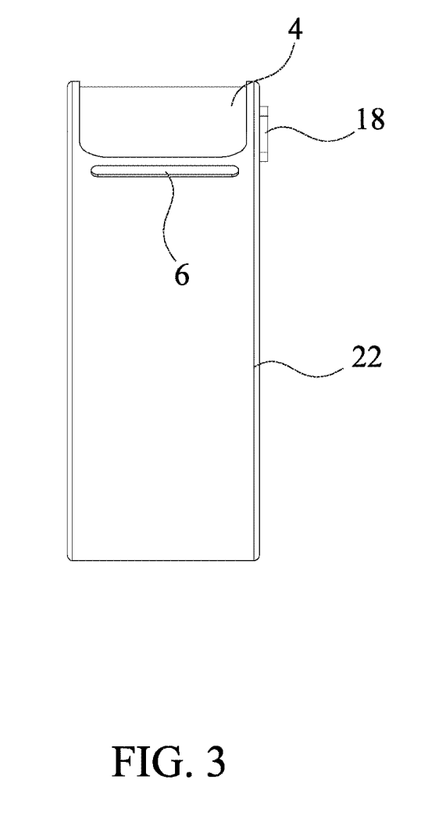
FIG. 3 is a rear view of the present invention.
Figure 4:
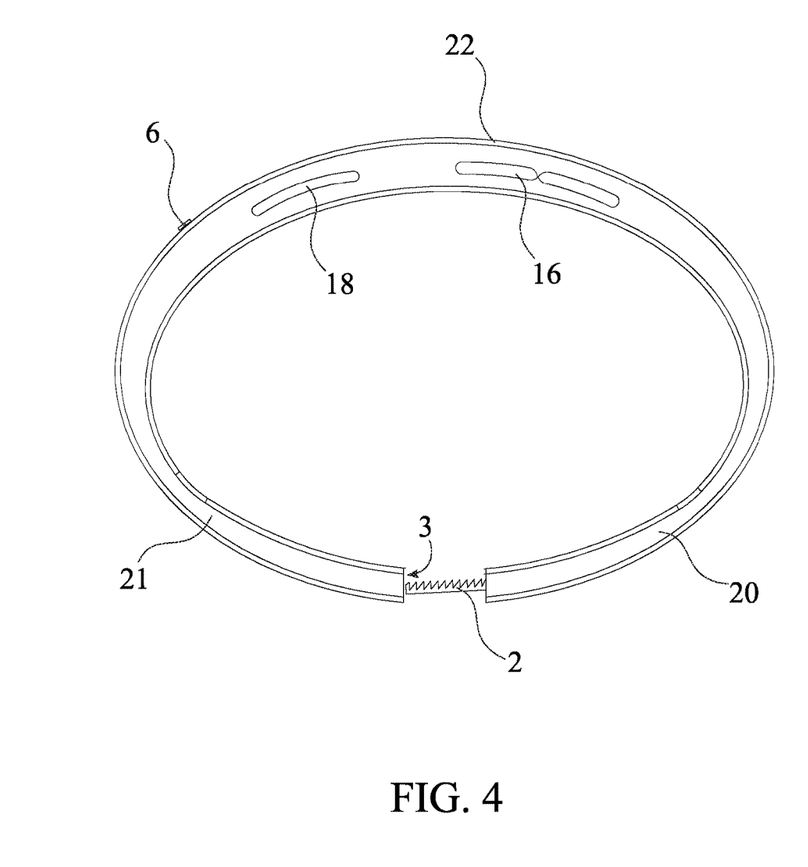
FIG. 4 is a left view of the present invention.

For some embodiments of the present invention, the present invention comprises a microphone 14, shown in FIG. 1, FIG. 2, and FIG. 9. The microphone 14 receives audio inputs from the environment around the present invention, such as a parent speaking a phrase for voice recognition to release the strap lock receiver 3 or the voices of unsuspecting kidnappers to be transmitted to the parents or authorities. The microphone 14 is integrated into the band housing 1 to receive the ambient audio clearly. The microphone 14 is electronically connected to the microprocessor 8 in order to process the audio with the voice recognition software or transmitted with the wireless receiver.

In accordance to some embodiments of the present invention, the present invention comprises an auditory output device 15, shown in FIG. 1, FIG. 2, and FIG. 9. The audio output device allows the present invention to output audio, from a parent or authority, received through the wireless transceiver 10 or from the software as a warning signal. The auditory output device 15 is integrated into the band housing 1, such that the audio output is not obfuscated by the band housing 1. The auditory output device 15 is electronically connected to the microprocessor 8 to process the audio output from the wireless receiver or from software to the auditory output device 15.

More specific to this embodiment, the present invention comprises a volume button 16, shown in FIG. 1, FIG. 2, FIG. 4, FIG. 6, FIG. 7, and FIG. 9. The volume button 16 allows the wearer to adjust the volume of the audio output from the auditory output device 15. The volume button 16 is externally mounted into the band housing 1 to allow the wearer to access the volume button 16. The volume button 16 is electronically connected to the auditory output device 15 through the microprocessor 8 to adjust the volume of the auditory output device 15.

In accordance to the preferred embodiment of the present invention the present invention comprises a battery 17, shown in FIG. 9. The battery 17 provides electrical power to the microprocessor 8 and the connected electrical components. The battery 17 being internally mounted to the band housing 1. The battery 17 being electrically connected to the microprocessor 8 to distribute power to the connected electrical components.

The present invention further comprises a power button 18 to toggle the present invention on or off, shown in FIG. 1, FIG. 3, FIG. 4, FIG. 6, FIG. 7, and FIG. 9. The power button 18 is externally mounted into the band housing 1. The power button 18 is electronically connected to the microprocessor 8 to toggle power to the electrical components of the present invention.

Further in accordance to the preferred embodiment of the present invention, the strap lock 2 comprises an electromagnet 23 and the strap lock receiver 3 comprises an electromagnet 23, detailed in FIG. 9. The electromagnet 23 of the strap lock 2 and the strap lock receiver 3 allow the strap lock 2 to be secured to the strap lock receiver 3 as electricity is received to increase the magnetic force between the strap lock 2 and the strap lock receiver 3. The electromagnet 23 of the strap lock 2 and the electromagnet 23 of the strap lock receiver 3 is electronically connected to the microprocessor 8, thus allowing the microprocessor 8 to control the electricity to the electromagnet 23 of the strap lock 2 and the electromagnet 23 of the strap lock receiver 3. The electromagnet 23 of the strap lock 2 magnetically and selectively engage the electromagnet 23 of the strap lock receiver 3, in order to secure the present invention to a wearer.

In some embodiments of the present invention the strap lock 2 is serrated and the strap lock receiver 3 is serrated, in accordance to FIG. 8. The serrated strap lock 2 and the serrated strap lock receiver 3 interlock with each other to prevent the strap lock 2 from being removed from the strap lock receiver 3. In some such embodiments, the present invention comprises a lock release 19. The lock release 19 disengages the strap lock receiver 3 from the strap lock 2 in order to allow the strap lock 2 to be removed from the strap lock receiver 3 and the present invention to be removed from the wearer. The lock release 19 traverses through the band housing 1 in order for the parent or authorized guardian to engage the lock release 19. The lock release 19 is adjacently connected to the strap lock receiver 3 to allow the parent or guardian to manually release the strap lock 2. The lock release 19 is adjacently positioned to the second emergency button 7 such that the lock release 19 is able to be confused for the second emergency button 7, wherein the second emergency button 7 may accidentally be actuated, initiating a signal for help if the operator is not familiar with the present invention.

Figure 10:
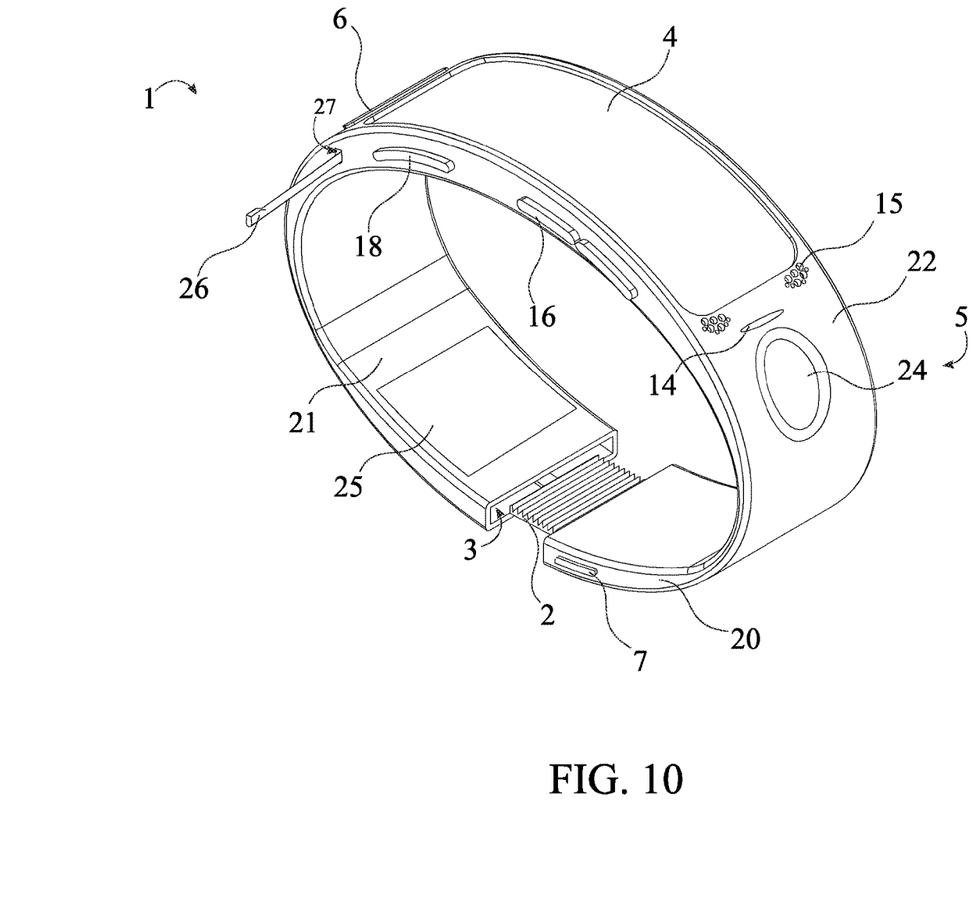
FIG. 10 is a perspective view for an alternate embodiment of the present invention that includes a stylus.

In some embodiments of the present invention, the present invention comprises a stylus 26 and a stylus receiving opening 27, in accordance to FIG. 10. The stylus 26 is able to be used to draw, write or tap on the tactile sensor 4 as an alternative to the wearer's finger for greater precision. The stylus receiving opening 27 allows the stylus 26 to be stored and transported with the band housing 1. The stylus receiving opening 27 laterally traverses into the band housing 1 to allow the stylus 26 to be positioned within the band housing 1. The stylus 26 is slideably engaged with the stylus receiving opening 27 to allow the wearer to remove the stylus 26 easily.

Although the invention has been explained in relation to its preferred embodiment, it is to be understood that many other possible modifications and variations can be made without departing from the spirit and scope of the invention as hereinafter claimed.

What is claimed is:

1. A digital wearable monitoring device with dual locking system comprises:
   a band housing;
   a strap lock;
   a strap lock receiver;
   a tactile sensor;
   at least one biometric input device;
   a first emergency button;
   a second emergency button;
   a microprocessor;
   a locating device;
   a wireless transceiver;
   the band housing comprises a first band strap, a second band strap, and a band face;
   the first band strap and the second band strap being oppositely positioned to each other along the band face;
   the strap lock being terminally integrated to the first band strap;
   the strap lock receiver being terminally integrated into the second band strap;
   the tactile sensor, the at least one biometric input device, the first emergency button, and the second emergency button being externally mounted into the band housing;
   the tactile sensor being centrally positioned along the band face;
   the first emergency button being adjacently positioned to the tactile sensor;
   the second emergency button being adjacently positioned to the strap locking mechanism;
   the microprocessor, the locating device, and the wireless transceiver being internally mounted to the band housing; and
   the tactile sensor, the at least one biometric input device, the first emergency button, the second emergency button, the location device, and the wireless transceiver being electronically coupled to the microprocessor.

2. The digital wearable monitoring device with dual locking system, as claimed in claim 1, comprises:
   the strap lock selectively engaging the strap lock receiver.

3. The digital wearable monitoring device with dual locking system, as claimed in claim 1, comprises:
   a display device; and
   the display device being integrated with the tactile sensor.

4. The digital wearable monitoring device with dual locking system, as claimed in claim 1, comprises:
   the at least one biometric input device comprises a fingerprint scanner; and
   the fingerprint scanner being adjacently positioned to the tactile sensor.

5. The digital wearable monitoring device with dual locking system, as claimed in claim 1, comprises:
   the at least one biometric input device comprises a heartrate monitor; and
   the heartrate monitor being oppositely positioned to the tactile sensor about the band housing.

6. The digital wearable monitoring device with dual locking system, as claimed in claim 1, comprises:
   a serial communication port;
   the serial communication port being laterally integrated into the band housing; and
   the serial communication port being electronically connected to the microprocessor.

7. The digital wearable monitoring device with dual locking system, as claimed in claim 1, comprises:
   a data storage device;
   the data storage device being internally mounted to the band housing; and
   the data storage device being electronically connected to the microprocessor.

8. The digital wearable monitoring device with dual locking system, as claimed in claim 1, comprises:
   a microphone;
   the microphone being integrated into the band housing; and
   the microphone being electronically connected to the microprocessor.

9. The digital wearable monitoring device with dual locking system, as claimed in claim 8, comprises:
   a volume button;
   the volume button being externally mounted into the band housing; and
   the volume button being electronically connected to auditory output device through the microprocessor.

10. The digital wearable monitoring device with dual locking system, as claimed in claim 1, comprises:
    an auditory output device;

the auditory output device being integrated into the band housing; and the auditory output device being electronically connected to the microprocessor.

11. The digital wearable monitoring device with dual locking system, as claimed in claim 1, comprises:

a battery;

the battery being internally mounted to the band housing; and the batter being electrically connected to the microprocessor.

12. The digital wearable monitoring device with dual locking system, as claimed in claim 1, comprises:

a power button;

the power button being externally mounted into the band housing; and the power button being electronically connected to the microprocessor.

13. The digital wearable monitoring device with dual locking system, as claimed in claim 12, comprises:

the electromagnet of the strap lock magnetically and selectively engaging the electromagnet of the strap lock receiver.

14. The digital wearable monitoring device with dual locking system, as claimed in claim 1, comprises:

the strap lock comprises an electromagnet;

the strap lock receiver comprises an electromagnet; and the electromagnet of the strap lock and the electromagnet of the strap lock receiver being electronically connected to the microprocessor.

15. The digital wearable monitoring device with dual locking system, as claimed in claim 14, comprises:

the lock release being adjacently positioned to the second emergency button.

16. The digital wearable monitoring device with dual locking system, as claimed in claim 1, comprises:

the strap lock being serrated; and the strap lock receiver being serrated.

17. The digital wearable monitoring device with dual locking system, as claimed in claim 1, comprises:

a lock release;

the lock release traversing through the band housing; and the lock release being adjacently connected to the strap lock receiver.

18. The digital wearable monitoring device with dual locking system, as claimed in claim 1, comprises:

a stylus;

a stylus receiving opening;

the stylus receiving opening laterally traversing into the band housing;

the stylus being slideably engaged with the stylus receiving opening.

* * * * *